United States Patent

Albrecht et al.

[11] 3,716,531
[45] Feb. 13, 1973

[54] 5-NITRO-FURFURYLIDENE ANTIMICROBIC AGENTS

[75] Inventors: Rudolf Albrecht; Eberhard Schroder, both of Berlin, Germany; Mahmoud Muftic, Cornavin-Geneve, Switzerland

[73] Assignee: Schering AG, Berlin and Bergkamen, Germany; by said Albrecht and Schroder

[22] Filed: Oct. 31, 1968

[21] Appl. No.: 804,333

[30] Foreign Application Priority Data

Nov. 14, 1967 Germany..........................Sch 41572

[52] U.S. Cl. ........260/240 A, 260/327 B, 260/330.5, 260/345.2, 260/346.2 R, 260/488 CD, 260/556 B, 260/556 C, 260/570.7, 260/570.8 R, 260/570.9, 260/577, 260/578, 260/590, 424/274, 424/275, 424/283, 424/285
[51] Int. Cl. ...............................................C07d 5/30
[58] Field of Search...................260/240 A

[56] References Cited

OTHER PUBLICATIONS

Chemical Abstracts I, Vol. 57, Cols. 13714 to 13716 (1962) (abstract of Corvaisier).
Chemical Abstracts II, Vol. 60, Cols. 1678 (1964) (abstract of Mackanova et al.).
Chemical Abstracts III, Vol. 64, Col. 14168 (1966) (abstract of Japanese Patent 2552 (1966).
Toyoshima et al., Journ. Pharm. Soc. Japan, Vol. 88, pp. 589–592 (May 1968).
Tirouflet et al., Comptes Rendus, Vol. 250, pp. 1276 to 1278 (1960).
Miura et al., Progress in Medicinal Chemistry Vol. 5, chapter 6, pages 320–322, 329–333, Butterworths, London (1967).

Primary Examiner—Henry R. Jiles
Assistant Examiner—G. Thomas Todd
Attorney—Millen, Raptes & White

[57] ABSTRACT

For combating and preventing infections caused by a variety of microbes such as bacteria and Trichomonas vaginalis, new compounds of the formula

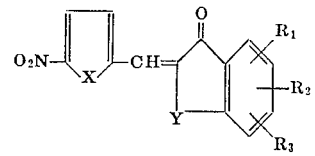

wherein
X is O, S or NH;
Y is O; S; —CH$_2$—O—; —S—CH$_2$—; —CH$_2$—S—; —O—CH$_{2b}$—; —SO—; —SO—CH$_2$—; —CH$_2$—SO—; —CH$_2$—SO$_2$—; —SO$_2$—CH$_2$— or —CA$_2$—, A being H, methyl, ethyl or phenyl; and
R$_1$, R$_2$ and R$_3$ each represents alkyl, hydroxy, hydroxyalkyl, alkoxy, alkoxyalkyl, alkoxyalkoxy, mono- or dialkylaminoalkyl, dialkylaminoalkoxy, amino, acylamino, mono- or dialkylamino, alkylsulfonylamino, acyloxy, alkylsulfonyloxy, benzyloxy groups wherein each alkyl, alkoxy or acyl residue is not more than five carbon atoms and acyl is derived from a carboxylic acid; halogen; or hydrogen with the provision that when Y represents —CH$_2$—, at least one of R$_1$, R$_2$, and R$_3$ is other than hydrogen.

13 Claims, No Drawings

5-NITRO-FURFURYLIDENE ANTIMICROBIC AGENTS

BACKGROUND OF THE INVENTION

This invention relates to compounds structurally novel and unobvious but somewhat analogous to 2-(5-nitro-furfurylidene)-indanone.

The latter compound, though known, is not a particularly outstanding agent for the treatment of infections caused by such microorganisms as *Trichomonas vaginalis*, *M. tuberculosis*, *M. battey*, *M. avium*, and *M. kanasii* and others. However, there is a genuine need for drugs which would be effective against such intractable infections.

SUMMARY OF THE INVENTION

Relevant to the above need, an object of this invention is to provide antimicrobic pharmaceutical compositions and methods of administration especially applicable to the preceding microbes.

Another object of this invention is to provide novel chemical compounds, as well as processes and intermediates for their manufacture.

Upon further study of the specification and claims, other objects and advantages of the present invention will become apparent.

To attain the above objects there are provided compounds of the following Formula I:

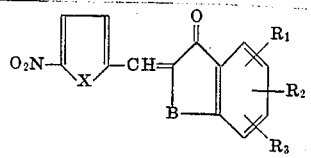

wherein
X is O, S or NH;
Y is O; S; —CH$_2$—O—; —O—CH$_2$—; —S—CH$_2$—; —CH$_2$—S—; —SO—; —SO—CH$_2$—; —CH$_2$—SO; —CH$_2$—$_2$—; —SO$_2$—CH$_2$—; or —CA$_2$—;
A being H, methyl, ethyl or phenyl; and
R$_1$-R$_3$, being identical or different, represent alkyl, hydroxy, hydroxyalkyl, alkoxy, alkoxyalkyl, alkoxy-alkoxy, mono- or dialkylaminoalkyl, dialkylaminoalkoxy, amino, acylamino, mono- or dialkylamino, alkylsulfonyl-amino, acyloxy, alkylsulfonyloxy, benzyloxy groups, wherein each alkyl, alkoxy or acyl residue is preferably of no more than five carbon atoms; halogen; or hydrogen, with the provision that when Y is —CH$_2$—, the residues R$_1$-R$_3$ cannot all represent hydrogen. Mixtures of these compounds are also effective.

DETAILED DISCUSSION OF THE INVENTION

Respecting the definition of R$_1$, R$_2$, and R$_3$ in the above formula, it is preferred that at least one of same represents hydroxy or alkoxy of one to two carbon atoms, such as methoxy.

It is also preferred that when Y is —CH$_2$—, at least two R$_1$-R$_3$ are not hydrogen, preferably at least one being alkoxy or hydroxy.

Of particular importance, moreover, are the compounds wherein one of R$_1$-R$_3$ is hydroxy and another is alkoxy.

Additional preferred subgeneric groups which are especially unobvious from the standpoint of structural chemistry are as follows:

a. X represents S or NH;
b. Y is other than —CH$_2$—;
c. Y is other than —CH$_2$— and preferably at least one of R$_1$-R$_3$ is other than H, particularly other than alkyl;
d. Y is —CH$_2$— and at least one of R$_1$-R$_3$ is hydroxyalkyl, alkoxyalkyl, alkoxyalkoxy, mono- or dialkylaminoalkyl, dialkylaminoalkoxy, amino, acylamino, mono- or dialkylamino, alkylsulfonylamino, acyloxy, alkylsulfonyloxy, or benzyloxy, wherein the acyl portion is derived from a carboxylic acid.

The novel compounds can be prepared by the following processes:

a. An aldehyde of the general Formula II

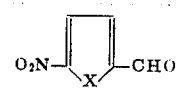

wherein
X has the above-indicated meanings, or a functional derivative of the aldehyde, is reacted with a compound of the general Formula III

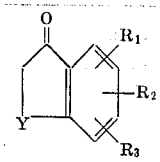

wherein
Y and R$_1$ to R$_3$ have the above-indicated meanings;
or
b. a compound of the general Formula IV

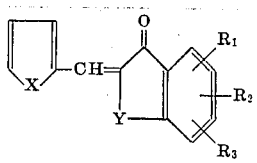

wherein
X, Y and R$_1$-R$_3$ have the above-indicated meanings, is nitrated;
or
c. with the provision that Y in the final product represents an —SO—, —SO—CH$_2$—, —CH$_2$—SO—, —SO$_2$—CH$_2$—, or —CH$_2$—SO$_2$— group, a compound of the general Formula V as follows is subjected to an oxidizing reaction:

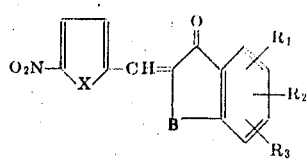

wherein
X and R$_1$-R$_3$ have the above-indicated meanings, and
B represents the groups —S—, —S—CH$_2$—, —CH$_2$—S— or optionally —SO—, —SO—CH$_2$—, or —CH$_2$—.

The process according to (a) is conducted at room temperature or an elevated temperature in an acidic reaction medium, for example, in glacial acetic acid in the presence of concentrated sulfuric acid, or in orthophosphoric acid. The reaction can also be carried out in an acid anhydride at an elevated temperature. Any esterification of hydroxyl groups, which can occur during this reaction, can be reversed by saponification. Preferred functional derivatives of the aldehydes are the diacetates.

The nitration in accordance with (b) can be conducted along the lines of the conventional methods, e.g., with nitric acid in $HOAc/Ac_2O$.

The oxidation of the sulfur in the compound of general Formula V to the sulfoxide or to the sulfone can be conducted, for example, with hydrogen peroxide. The sulfone can also be obtained by oxidation of the sulfoxide.

The compounds of Formula I are crystalline substances and are slightly, if at all, soluble in water. They can be isolated from their synthesis reaction mixtures by the introduction of ice water. For purification purposes, the compounds can be recrystallized, for example, from ethanol, ethyl acetate, glacial acetic acid, dioxane, tetrahydrofuran or nitromethane.

The novel compounds exhibit good antimicrobic effects, particularly against *Trichomonas vaginalis* and *Mycobacterium tuberculosis*. Table 1 shows the superior effectiveness of the novel substances against *Trichomonas vaginalis*, using examples of the compound of Formula I in comparison with 2-(5-nitrofurfurylidene)-indanone (VI), the latter being previously disclosed in a published Japanese Patent Application 41/2552. The novel compounds of Formula I are particularly successful for the oral treatment of *Trichomonas vaginalis* infections. Thus, in pharmacological tests, it has been determined that the curative oral dosage ($CD_{50}$), administered to mice once daily, is about 17 mg per kg of body weight.

Table II demonstrates the antimicrobic effect of the compounds of this invention against Mycobacteria in comparison with compound VI (plate test). Likewise, in the tube test, 2-(5-nitro-2-furfurylidene)-5-acetoxy-indanone exhibits a minimum inhibitory concentration of < 1 γ/ml against *Mycobacterium tuberculosis* and < 0.1 γ/ml against *Mycobacterium avium*. The latter compound is also effective in vivo, as can be seen from the following experiment: Groups of 5 mice each were infected with Mycobacterium tuberculosis $H_{37}Rv$ intravenously (1 mg/mouse). Eleven days after infection, whereas all untreated animals had died, of those animals treated once with 100 mg/kg subcutaneously 48 hours before infection, four out of five remained alive.

Compounds of Formula I exhibit an antimicrobic effect over an extraordinarily broad range, i.e., against gram-positive and gram-negative bacteria, mycobacteria and fungi, so that the compounds can be employed as antiseptics. The minimum inhibitory concentrations of typical compounds against a wide variety of microbes are compiled in Table III.

The toxicity of the novel compounds is negligible as in all cases it is greater than 4 g./kg; accordingly the therapeutic index of the compounds of this invention is very high. The novel compounds are especially suitable for the treatment of trichomoniasis and tuberculosis.

Because the compounds of this invention can be employed in vitro as well as in vivo, they are especially useful as disinfectants, e.g., in the sterilization of medical instruments and the like, as well as in cleansing solutions for cleaning woodwork, towels, linen, blankets, dishes and the like, to prevent spread of infection.

The novel compounds of this invention can be employed in mixture with conventional pharmaceutical excipients. Carrier substances can be such organic or inorganic substances suitable for parenteral, enteral, or topical application, and which, of course, do not deleteriously react with the novel compounds, such as, for example, water, vegetable oils, polyethylene glycols, gelatin, lactose, amylose, magnesium stearate, talc, vaseline, cholesterol, etc.

For parenteral application, particularly suitable are solutions, preferably oily or aqueous solutions, as well as suspensions, emulsions or implants. Ampoules are convenient unit dosages.

For enteral application, particularly suitable are tablets or dragees which are also characterized by talc and/or a carbohydrate carrier or binder or the like, the carbohydrate carrier being preferably lactose and/or corn starch and/or potato starch. A syrup or the like can also be used wherein a sweetened vehicle is employed.

For topical application, viscous to semi-solid forms are used such as liniments, salves or creams, which are, if desired, sterilized, or mixed with auxiliary agents, such as preservatives, stabilizers, or wetting agents, or salts for influencing the osmotic pressure, or with buffer substances.

The substances of this invention are generally administered to animals, including, but not limited to, mammals and avians, e.g., cattle, cats, dogs, and poultry. A daily dosage comprises about 0.1–2.0 g. active compound of this invention and 1–5,000 mg. of pharmaceutically acceptable carrier. The dose can be given all at once or as divided dosages throughout the day. In general, the mg/kg ratio is preferably about 1 to 20 mg per kg of body weight.

Whereas, it is preferred to administer the compounds orally, vaginal tablets and suppositories are also quite useful, particularly for treatment against Trichomonas vaginalis.

The previously referred to tables now follow:

TABLE I

| Compound | Minimum Inhibitory Concentration in γ/ml against *Trichomonas vaginalis* |
|---|---|
| Comparative substance VI | >100 |
| 2-(5-nitro-2-furfurylidene)-5-methoxy-1-indanone | 0.05 |
| 2-(5-nitro-2-furfurylidene)-4-methoxy-1-indanone | <0.5 |
| 2-(5-nitro-2-furfurylidene)-5-hydroxy-1-indanone | <0.05 |
| 2-(5-nitro-2-furfurylidene)-4-hydroxy-1-indanone | <0.05 |
| 2-(5-nitro-2-furfurylidene)-6-hydroxy-5-methoxy-1-indanone | <0.025 |

TABLE II (Minimum Inhibitory Concentrations in γ/ml in the Plate Test)

| Mycobacterium | Compound VI | 2-(5-nitro-2-furfuryl-idene)-6-hydroxy-5-methoxy-1-indanone | 2-(5-nitro-2-furfuryl-idene(5-acetoxy-1-indanone |
|---|---|---|---|
| M.tuberculosis | <100 | <1 | <1 |
| M.battey | <100 | <1 | <10 |
| M.avium | <50 | <50 | <10 |
| M.kansasii | <50 | <50 | <10 |

TABLE III (Minimum Inhibitory Concentrations in γ/ml)

| Microorganism | 2-(5-nitro-2-furfurylidene)-4-methyl-1-indanone | 2-(5-nitro-2-furfurylidene)-6-methyl-1-indanone | 2-(5-nitro-2-furfurylidene)-3-benzofuranone |
|---|---|---|---|
| Staphylococcus aureus | <50 | <10 | <50 |
| Escherichia coli | <50 | <10 | <50 |
| Klebsiella pneumoniae | <50 | <50 | |
| Proteus vulgaris | | | <50 |
| Mycobacterium avium | <50 | <10 | <50 |
| Mycobacterium kansasii | <50 | <10 | <50 |
| Candida albicans | <10 | <50 | <50 |
| Microsporum gypseum | <10 | <50 | <10 |
| Trichophyton mentagrophytes | <10 | <50 | <10 |
| Epidermophyton floccosum | <10 | <50 | <10 |

*A: 2-(5-nitro-2-furfurylidene)-4-methyl-1-indanone.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

2-(5-nitro-2-furfurylidene)-5-methoxy-indanone a. 11.35 g. (70 millimols) of 5-methoxy-indanone is suspended in 140 ml. of orthophosphoric acid (85 percent), and 9.87 g. (70 millimols) of nitrofurfural is added. The mixture is stirred for 6 hours at 50° C., allowed to stand overnight at room temperature, and poured into ice water. The insoluble product is filtered off and recrystallized from ethanol.

Yield: 8.0 g. (40 percent of theory), m.p. 204° C.

$C_{15}H_{11}NO_5$ (285.3)

| | C | H | N |
|---|---|---|---|
| Calculated | 63.20 | 3.88 | 4.92 |
| Found | 63.45 | 3.82 | 4.92 | b. 2.4 g. (10 millimols) of nitrofurfural diacetate is dissolved in 5 ml. of glacial acetic acid and 0.35 ml. of concentrated $H_2SO_4$; the reaction solution is heated on a steam bath for 5 minutes, then cooled to 0° C., and 1.62 g. (10 millimols) of 5-methoxy-indanone is added. The mixture is agitated for 4 hours at room temperature, poured in ice water, and the precipitated product is filtered off and recrystallized from nitromethane.

Yield: 1.6 g. (56 percent of theory), m.p. 204° C.

c. 4.86 g. (20 millimols) of nitrofurfural diacetate and 3.2 g. (20 millimols) of 5-methoxy-indanone are stirred in 20 ml. of orthophosphoric acid (85 percent) for 5 hours at 80° C.; then, the mixture is poured into ice water, the thus-precipitated product is filtered off and recrystallized from glacial acetic acid.

Yield: 3.8 g. (67% of theory), m.p. 204° C.

EXAMPLE 2

2-(5-nitro-2-furfurylidene)-4-chloroindanone 1.66 g. (10 millimols) of 4-chloroindanone is suspended in 20 ml. of orthophosphoric acid (85 percent), and 1.41 g. (10 millimols) of nitrofurfural is added. The mixture is stirred for 6 hours at 50° C. and then poured into ice water; the insoluble product is filtered off and recrystallized from dioxane.

Yield: 2.65 g. (92 percent of theory), m.p. 206° C.

$C_{14}H_8ClNO_4$ (289.7)

| | C | H | N | Cl |
|---|---|---|---|---|
| Calculated | 58.00 | 2.78 | 4.84 | 12.25 |
| Found | 58.22 | 2.94 | 4.78 | 12.21 |

EXAMPLE 3

2-(5-nitro-2-furfurylidene)-5-chloroindanone

The process for the preparation of this compound is conducted analogously to that set forth in Example 2, but using 1.66 g. of 5-chloroindanone.

Yield: 1.7 g. (59 percent of theory), m.p. 230°–231° C. (from dioxane).

$C_{14}H_8ClNO_4$ (289.7)

| | C | H | N | Cl |
|---|---|---|---|---|
| Calculated | 58.00 | 2.78 | 4.84 | 12.25 |
| Found | 58.43 | 2.77 | 4.33 | 11.99 |

EXAMPLE 4

2-(5-nitro-2-furfurylidene)-6-chloroindanone

The process for the preparation of this compound is conducted analogously to that set forth in Example 2, but using 1.66 g. of 6-chloroindanone.

Yield: 1.75 g. (61 percent of theory), m.p. 206° C. (from dioxane).

$C_{14}H_8ClNO_4$ (289.7)

| | C | H | N |
|---|---|---|---|
| Calculated | 58.00 | 2.78 | 4.84 |
| Found | 57.92 | 3.33 | 4.63 |

EXAMPLE 5

2-(5-nitro-2-furfurylidene)-4-methyl-indanone

The process for the preparation of this compound is conducted as set out in Example 2, in an analogous manner, but employing 1.46 g. (10 millimols) of 4-methyl-indanone.

Yield: 500 mg. (18 percent of theory), m.p. 201°–202° C. (from ethanol).

$C_{15}H_{12}NO_4$ (270.3)

| | C | H | N |
|---|---|---|---|
| Calculated | 66.60 | 4.44 | 5.18 |
| Found | 67.02 | 3.97 | 5.16 |

EXAMPLE 6

2-(5-nitro-2-furfurylidene)-6-methyl-indanone

This compound is prepared analogously to Example 2, but employing 1.46 g. (10 millimols) of 6-methyl-indanone.

Yield: 2.3 g. (85 percent of theory), m.p. 173°–175° C. (from dioxane).

EXAMPLE 7

2-(5-nitro-2-furfurylidene)-6-isopropyl-indanone

This compound is produced analogously to Example 2, but with 1.74 g. of 6-isopropyl-indanone.

Yield: 2.52 g. (87 percent of theory), m.p. 151° C.

EXAMPLE 8

2-(5-nitro-2-furfurylidene)-5-hydroxy-indanone 2.96 g. (20 millimols) of 5-hydroxy-indanone is suspended in 20 ml. of orthophosphoric acid (85 percent), and 2.82 g. (20 millimols) of nitrofurfural is added. The reaction mixture is agitated for 7 hours at 50° C., then poured in ice water, and the insoluble product is filtered off and recrystallized from ethanol.

Yield: 0.95 g. (18 percent of theory), m.p. 230° C. (decomposition).

EXAMPLE 9

2-(5-nitro-2-furfurylidene)-7-methoxy-indanone

Eight hundred mg. (5 millimols) of 7-methoxy-indanone and 700 mg. (5 millimols) of 5-nitrofurfural are agitated in 10 ml. of orthophosphoric acid (85 percent) for 6 hours at 50° C., poured in ice water, and the insoluble product is recrystallized from dioxane.

Yield: 1.1 g. (82 percent of theory), m.p. 242°–243° C.

EXAMPLE 10

2-(5-nitro-2-furfurylidene)-5-ethoxy-indanone 1.76 g. (10 millimols) of 5-ethoxy-indanone and 1.41 g. (10 millimols) of 5-nitrofurfural are agitated in 20 ml. of orthophosphoric acid (85%) for 6 hours at 50° C., allowed to stand overnight, and poured in ice water. The insoluble product is recrystallized from ethanol.

Yield: 0.5 g. (17 percent of theory), m.p. 207°–208° C. (decomposition).

$C_{16}H_{13}O_5$ (299.3)

|  | C | H | N |
|---|---|---|---|
| Calculated | 64.30 | 4.38 | 4.68 |
| Found | 64.07 | 4.07 | 4.61 |

EXAMPLE 11

2-(5-nitro-2-furfurylidene)-5-methanesulfonyloxy-indanone 2.26 g. (10 millimols) of 5-methanesulfonyloxy-indanone and 1.4 g. (10 millimols) of 5-nitrofurfural are stirred in 20 ml. of orthophosphoric acid (85 percent) for 5 hours at 50° C. and allowed to stand overnight at room temperature. The insoluble product, precipitated with ice water, is recrystallized from dioxane.

Yield: 1.8 g. (51 percent of theory), m.p. 225° C. (decomposition).

EXAMPLE 12

2-(5-nitro-2-furfurylidene)-benzofuranone-(3)

1.34 g. (10 millimols) of benzofuranone-(3) is suspended in 20 ml. of $H_3PO_4$ (85%) and mixed with 1.4 g. (10 millimols) of 5-nitrofurfural. The mixture is stirred for 5 hours at 50° C., allowed to stand overnight at room temperature, and then poured in ice water. The insoluble product is filtered off and recrystallized from ethanol.

Yield: 0.8 g. (32 percent of theory), m.p. 163°–166° C.

EXAMPLE 13

2-(5-nitro-2-furfurylidene)-thioindoxyl 1.5 g. (10 millimols) of thioindoxyl is suspended in 25 ml. of orthophosphoric acid (85 percent), and 1.41 g. (10 millimols) of nitrofurfural is added. A thick crystalline sludge is produced at once, which is stirred with ice water after having been allowed to stand overnight. The insoluble product is filtered off and recrystallized from ethyl acetate.

Yield: 1.8 g. (66 percent of theory), m.p. 202°–203° C.

$C_{13}H_7NO_4S$ (273.3)

|  | C | H | N | S |
|---|---|---|---|---|
| Calculated | 57.20 | 2.58 | 5.12 | 11.70 |
| Found | 57.57 | 2.98 | 5.11 | 11.86 |

EXAMPLE 14

2-(5-nitro-2-furfurylidene)-thioindoxyl-S-oxide 1.09 g. (4 millimols) of 2-(5-nitro-2-furfurylidene)-thioindoxyl is suspended in 100 ml. of glacial acetic acid, and 1 ml. of an aqueous 30% $H_2O_2$ solution in 20 ml. of glacial acetic acid is added under stirring. The reaction mixture is agitated at room temperature for 2 days; during this time, 1 ml. portions of 30% $H_2O_2$ are added twice. The clear solution is then poured in ice water, the insoluble product is filtered off and recrystallized from nitromethane.

Yield: 0.5 g. (43 percent of theory), m.p. 222°–224° C.

$C_{13}H_7NO_5S$ (289.3)

|  | C | H | N | S |
|---|---|---|---|---|
| Calculated | 53.80 | 2.44 | 4.83 | 11.00 |
| Found | 53.49 | 2.19 | 4.92 | 10.83 |

EXAMPLE 15

3-(5-nitro-2-furfurylidene)-chromanone 1.48 g. (10 millimols) of chromanone is suspended in 20 ml. of orthophosphoric acid (85 percent), and 1.41 g. (10 millimols) of 5-nitrofurfural is added. The mixture is stirred for 5 hours at 50° C., then allowed to stand overnight at room temperature, poured in ice water, and the insoluble product is recrystallized from ethanol.

Yield: 0.9 g. (33 percent of theory), m.p. 180°–182° C. (decomposition).

$C_{14}H_9NO_5$ (271.2)

|  | C | H | N |
|---|---|---|---|
| Calculated | 62.20 | 3.34 | 5.16 |
| Found | 61.66 | 3.56 | 4.93 |

EXAMPLE 16

3-(5-nitro-2-furfurylidene)-7-methoxy-isothiachromanone 3.88 g. (20 millimols) of 7-methoxy-isothiachromanone and 2.82 g. (20 millimols) of 5-nitrofurfural are agitated in 20 ml. of orthophosphoric acid (85 percent) for 40 hours at room temperature; the recrystallized product is vacuum filtered and recrystallized from ethyl acetate.

Yield: 3.9 g. (62 percent of theory), m.p. 190°–192° C.

$C_{15}H_{11}NO_5S$ (317.3)

|  | C | H | N | S |
|---|---|---|---|---|
| Calculated | 56.80 | 3.48 | 4.42 | 10.10 |
| Found | 56.49 | 3.44 | 4.26 | 10.11 |

EXAMPLE 17

3-(5-nitro-2-furfurylidene)-7-methoxy-isothiachromanone-S-oxide 1.26 g. (4 millimols) of 3-(5-nitro-2-furfurylidene)-7-methoxy-isothiachromanone is suspended in 100 ml. of glacial acetic acid, and under stirring, 0.4 ml. of 30 percent hydrogen peroxide in 20 ml. of glacial acetic acid is added and the reaction mixture agitated for 2 days. During this time, 1.2 ml. of hydrogen peroxide was further added in batches. Then, the reaction solution is poured in ice water, and the insoluble product is recrystallized from dioxane.

Yield: 0.55 g. (41 percent of theory), m.p. 206°–207° C.

$C_{15}H_{11}NO_6S$ (333.3)

|  | C | H | N | S |
|---|---|---|---|---|
| Calculated | 54.10 | 3.32 | 4.21 | 9.62 |
| Found | 54.11 | 3.51 | 4.16 | 9.84 |

EXAMPLE 18

3-(5-nitro-2-furfurylidene)-thiachromanone 16.4 g. (0.1 mol) of thiachromanone is suspended in 75 ml. of orthophosphoric acid (85 percent), and 14.1 g. (0.1 mol) of 5-nitrofurfural is added; the reaction mixture is agitated for 5 hours at room temperature and allowed to stand for 2 days. Then, the mixture is poured in ice water, and the insoluble product is recrystallized from dioxane.

Yield: 12.2 g. (42 percent of theory), m.p. 179° C. (decomposition).

$C_{14}H_9NO_4S$ (287.3)

|  | C | H | N | S |
|---|---|---|---|---|
| Calculated | 58.60 | 3.16 | 4.88 | 11.18 |
| Found | 58.31 | 3.18 | 4.60 | 10.99 |

EXAMPLE 19

3-(5-nitro-2-furfurylidene)-thiachromanone-S-oxide 14.0 g. (48.7 millimols) of 3-(5-nitro-2-furfurylidene)-thiachromanone is suspended in 1.2 l. of glacial acetic acid, and 15 ml. of 30% $H_2O_2$ in 200 ml. glacial acetic acid is added. After 3 hours of agitation, 10 ml. of 30% $H_2O_2$ is again added, and then the reaction mixture is stirred for another 2 days. The substance is precipitated with ice water, and the insoluble product is recrystallized from dioxane.

Yield: 11.3 g. (77 percent of theory), m.p. 191°–192° C.

$C_{14}H_9NO_5S$ (303.3)

|  | C | H | N | S |
|---|---|---|---|---|
| Calculated | 55.50 | 2.99 | 4.62 | 10.55 |
| Found | 55.70 | 2.80 | 4.28 | 10.36 |

EXAMPLE 20

3-(5-nitro-2-furfurylidene)-thiachromanone-S-dioxide 4.1 g. of thiachromanone-S-dioxide is suspended in 50 ml. of orthophosphoric acid (85 percent), and 2.8 g. of 5-nitrofurfural is added. The reaction mixture is stirred for 6 hours at room temperature and allowed to stand for 5 days. The mixture is precipitated with ice water, and the insoluble product is leached by boiling with ethanol. The product, which is insoluble in ethanol, is recrystallized from dioxane.

Yield: 1.2 g. (18 percent of theory), m.p. 214°–217° C. (decomposition).

$C_{14}H_9NO_6S$ (319.3)

|  | C | H | N | S |
|---|---|---|---|---|
| Calculated | 52.65 | 2.84 | 4.40 | 10.05 |
| Found | 52.97 | 3.12 | 4.15 | 9.86 |

EXAMPLE 21

2-(5-nitro-2-thenylidene)-5-methoxy-indanone 1.62 g. (10 millimols) of methoxy-indanone is suspended in 20 ml. of orthophosphoric acid (85 percent), and 1.57 g. (10 millimols) of 5-nitrothiophene-2-carboxaldehyde is added. The reaction mixture is agitated for 6 hours at 50° C., then poured in ice water, and the insoluble product is recrystallized from dioxane.

Yield: 1.5 g. (50 percent of theory), m.p. 250°–252° C.

$C_{15}H_{11}NO_4S$ (301.3)

|  | C | H | N | S |
|---|---|---|---|---|
| Calculated | 60.00 | 3.60 | 4.60 | 10.70 |
| Found | 59.66 | 3.78 | 4.51 | 10.60 |

EXAMPLE 22

3-(5-nitro-2-thenylidene)-thiachromanone-S-oxide 3.8 g. (20 millimols) of thiachromanone-S-oxide and 3.14 g. (20 millimols) of 5-nitrothiophene-2-carboxaldehyde are agitated in 20 ml. of orthophosphoric acid (85 percent) and 100 ml. of benzene for 5 days at room temperature; then, the reaction mixture is poured in ice water, the insoluble product is filtered off and recrystallized from dioxane.

Yield: 1.1 g. (17 percent of theory), m.p. 227° C. (decomposition).

$C_{14}H_9NO_4S_2$ (319.4)

|  | C | H | N | S |
|---|---|---|---|---|
| Calculated | 52.70 | 2.83 | 4.39 | 20.10 |
| Found | 53.07 | 3.20 | 4.58 | 20.18 |

EXAMPLE 23

2-(5-nitro-2-furfurylidene)-5-fluoro-1-indanone

The preparation of this compound is conducted analogously to Example 1(c), but with the use of 850 mg. of 5-fluoro-1-indanone. The product is recrystallized from ethyl acetate.

Yield: 1.1 g. (71 percent of theory), m.p. 222° C. (decomposition).

$C_{14}H_8FNO_4$ (273.2)

|  | C | H | N |
|---|---|---|---|
| Calculated | 61.50 | 2.95 | 5.13 |
| Found | 61.80 | 2.85 | 4.97 |

EXAMPLE 24

2-(5-nitro-2-furfurylidene)-6-fluoro-1-indanone

The preparation of this compound is conducted analogously to Example 1(c), but with 1.5 g. of 6-fluoro-1-indanone.

Yield: 2.0 g. (73 percent of theory), m.p. 212° C. (from ethyl acetate).

$C_{14}H_8FNO_4$ (273.2)

|  | C | H | N |
|---|---|---|---|
| Calculated | 61.50 | 2.95 | 5.13 |
| Found | 61.37 | 2.80 | 4.99 |

EXAMPLE 25

2-(5-nitro-2-furfurylidene)-5-methyl-1-indanone

The preparation of this compound is conducted analogously to Example 1(c), but with 1.96 g. of 5-methyl-1-indanone.

Yield: 1.4 g. (52 percent of theory), m.p. 215° C. (from ethyl acetate).

$C_{15}H_{12}NO_4$ (270.3)

|  | N |
|---|---|
| Calculated | 5.18 |
| Found | 5.13 |

EXAMPLE 26

2-(5-nitro-2-furfurylidene)-7-methyl-1-indanone

The preparation of this compound is conducted analogously to Example 1(c), but with 1.46 g. of 7-methyl-1-indanone.

Yield: 1.7 g. (63 percent of theory), m.p. 219° C. (from ethyl acetate).

$C_{15}H_{12}NO_4$ (270.3)

|  | N |
|---|---|
| Calculated | 5.18 |
| Found | 5.15 |

EXAMPLE 27

2-(5-nitro-2-furfurylidene)-3-methyl-1-indanone

This compound is prepared analogously to Example 1(c), but with 9.0 g. of 3-methyl-1-indanone.

Yield: 11.0 g. (66 percent of theory), m.p. 151° C. (from ethyl acetate).

$C_{15}H_{12}NO_4$ (270.3)

|  | C | H | N |
|---|---|---|---|
| Calculated | 66.60 | 4.44 | 5.18 |
| Found | 66.93 | 4.11 | 5.09 |

EXAMPLE 28

2-(5-nitro-2-furfurylidene)-5-hydroxy-3-methyl-1-indanone

The process for the preparation of this compound is conducted analogously to that of Example 1(c), but using 900 mg. of 5-hydroxy-3-methyl-1-indanone. The product is recrystallized from ethyl acetate.

Yield: 180 mg. (11 percent of theory), m.p. 234°–235° C. (decomposition).

$C_{15}H_{11}NO_5$ (285.3)

|  | N |
|---|---|
| Calculated | 4.91 |
| Found | 4.82 |

EXAMPLE 29

2-(5-nitro-2-furfurylidene)-4-methoxy-1-indanone

This compound is prepared analogously to Example 1(c), but employing 400 mg. of 4-methoxy-1-indanone.

Yield: 450 mg. (64 percent of theory), m.p. 223° C. (from ethyl acetate).

$C_{15}H_{11}NO_5$ (285.3)

|  | C | H | N |
|---|---|---|---|
| Calculated | 63.20 | 3.88 | 4.92 |
| Found | 63.34 | 3.83 | 4.82 |

EXAMPLE 30

2-(5-nitro-2-furfurylidene)-6-methoxy-1-indanone

The preparation of this compound is conducted analogously to Example 2, but with 1.2 g. of 6-methoxy-1-indanone. The product is recrystallized from dioxane.

Yield: 1.78 g. (85 percent of theory), m.p. 245° C. (decomposition).

$C_{15}H_{11}NO_5$ (285.3)

|  | N |
|---|---|
| Calculated | 4.92 |
| Found | 4.85 |

EXAMPLE 31

2-(5-nitro-2-furfurylidene)-5-methoxy-3-methyl-1-indanone

This compound is prepared analogously to the process set forth in Example 1(c), but with 2.1 g. of 5-methoxy-3-methyl-1-indanone. The product is recrystallized from ethyl acetate.

Yield: 1.5 g. (42 percent of theory), m.p. 181°–182° C. (decomposition).

$C_{16}H_{13}NO_5$ (299.3)

|  | C | H | N |
|---|---|---|---|
| Calculated | 64.20 | 4.37 | 4.68 |
| Found | 63.84 | 4.47 | 4.63 |

EXAMPLE 32

2-(5-nitro-2-furfurylidene)-4,5-dimethoxy-1-indanone

The preparation of this compound is conducted analogously to Example 2, but employing 1.92 g. of 4,5-dimethoxy-1-indanone. The product is recrystallized from glacial acetic acid.

Yield: 2.1 g. (67 percent of theory), m.p. 249° C. (decomposition).

EXAMPLE 33

2-(5-nitro-2-furfurylidene)-5,6-dimethoxy-1-indanone

This compound is prepared analogously to Example 2, but with 1.92 g. of 5,6-dimethoxy-1-indanone. The product is recrystallized from glacial acetic acid.

Yield: 0.9 g. (28 percent of theory), m.p. 257° C. (decomposition).

$C_{16}H_{13}NO_7$ (315.3)

|  | N |
|---|---|
| Calculated | 4.44 |
| Found | 4.35 |

EXAMPLE 34

2-(5-nitro-2-furfurylidene)-6-hydroxy-5-methoxy-1-indanone

The preparation of this compound is carried out analogously to Example 1(c), but with 8.9 g. of 6-hydroxy-5-methoxy-1-indanone. The product is recrystallized from ethyl acetate.

Yield: 10.1 g. (67 percent of theory), m.p. 247° C. (decomposition).

$C_{15}H_{11}NO_6$ (301.3)

|  | C | H | N |
|---|---|---|---|
| Calculated | 59.90 | 3.68 | 4.65 |
| Found | 60.29 | 3.89 | 4.34 |

EXAMPLE 35

2-(5-nitro-2-furfurylidene)-5-hydroxy-6-methoxy-1-indanone

The process for the preparation of this compound is conducted analogously to Example 1(c), but employing 1.78 g. of 5-hydroxy-6-methoxy-1-indanone. The product is recrystallized from ethanol/dioxane.

Yield: 2.0 g. (61 percent of theory), m.p. 254° C. (decomposition).

EXAMPLE 36

2-(5-nitro-2-furfurylidene)-5-n-butoxy-1-indanone

This compound is prepared analogously to Example 2, but with 2.04 g. of 5-n-butoxy-1-indanone.

Yield: 2.4 g. (73 percent of theory), m.p. 175°–176° C. (from ethyl acetate).

$C_{18}H_{17}NO_5$ (327.3)

|  | C | H | N |
|---|---|---|---|
| Calculated | 66.05 | 5.23 | 4.27 |
| Found | 65.71 | 5.41 | 4.43 |

EXAMPLE 37

2-(5-nitro-2-furfurylidene)-5-acetoxy-1-indanone

Six hundred mg. of 5-acetoxy-1-indanone and 450 mg. of nitrofurfural are refluxed for 5 hours in 20 ml. of acetic anhydride, cooled to 0° C., the crystallized product is vacuum filtered and recrystallized from ethyl acetate.

Yield: 300 mg. (33 percent of theory), m.p. 195°–202° C. (decomposition).

$C_{16}H_{11}NO_6$ (313.3)

|  | C | H | N |
|---|---|---|---|
| Calculated | 61.34 | 3.54 | 4.47 |
| Found | 61.30 | 3.80 | 4.38 |

EXAMPLE 38

2-(5-nitro-2-furfurylidene)-7-acetoxy-1-indanone 1.48 g. of 7-hydroxy-1-indanone and 1.4 g. of nitrofurfural are refluxed in 40 ml. of acetic anhydride for 5 hours, cooled to 0° C., and the crystallized product is recrystallized from ethyl acetate.

Yield: 1.1 g. (35 percent of theory), m.p. 196°–198° C.

$C_{16}H_{11}NO_6$ (313.3)

|  | N |
|---|---|
| Calculated | 4.47 |
| Found | 4.45 |

EXAMPLE 39

2-(5-nitro-2-furfurylidene)-7-hydroxy-1-indanone 1.7 g. of 2-(5-nitro-2-furfurylidene)-7-acetoxy-1-indanone is refluxed for 2 hours in 40 ml. of ethanol and 20 ml. of concentrated hydrochloric acid. The thus-produced precipitate is recrystallized from ethyl acetate.

Yield: 1.1 g. (78 percent of theory), m.p. 191°–194° C. (decomposition).

$C_{14}H_9NO_5$ (271.2)

|  | C | H | N |
|---|---|---|---|
| Calculated | 62.00 | 3.35 | 5.16 |
| Found | 62.06 | 3.46 | 5.16 |

EXAMPLE 40

2-(5-nitro-2-furfurylidene)-5-propionyloxy-1-indanone

Eight hundred mg. of 5-propionyloxy-1-indanone and 550 mg. of nitrofurfural are refluxed for 5 hours in 20 ml. of propionic acid anhydride. The reaction mixture is mixed with petroleum ether, and the thus-precipitated product is recrystallized from ethyl acetate.

Yield: 100 mg. (7 percent of theory), m.p. 182°–183° C. (decomposition).

$C_{17}H_{13}NO_6$ (327.3)

|  | C | H | N |
|---|---|---|---|
| Calculated | 62.39 | 4.00 | 4.28 |
| Found | 62.43 | 4.12 | 3.96 |

EXAMPLE 41

2-(5-nitro-2-furfurylidene)-6-methoxy-3-benzofuranone 1.05 g. of 6-methoxy-3-benzofuranone and 0.91 g. of 5-nitrofurfural are refluxed for 5 hours in 10 ml. of acetic anhydride, then cooled to −70° C.; the crystallized product is vacuum filtered and recrystallized from dimethyl formamide.

Yield: 1.2 g. (67 percent of theory), m.p. 232°–235° C.

$C_{14}H_9NO_6$ (287.2)

|  | N |
|---|---|
| Calculated | 4.88 |
| Found | 4.99 |

EXAMPLE 42

2-(5-nitro-2-furfurylidene)-6-hydroxy-3-benzofuranone

The preparation of this compound is conducted analogously to Example 1(c), but with 1.5 g. of 6-hydroxy-3-benzofuranone.

Yield: 505 mg. (18 percent of theory), m.p. 259°–265° C. (from dimethyl formamide).

$C_{13}H_7NO_7$ (273.2)

|  | N |
|---|---|
| Calculated | 5.13 |
| Found | 5.35 |

EXAMPLE 43

2-(5-nitro-2-furfurylidene)-6,7-dihydroxy-3-benzofuranone

This compound is prepared analogously to Example 1(c), but employing 1.66 g. of 6,7-dihydroxy-3-benzofuranone. The product is recrystallized from dimethyl formamide.

Yield: 2.0 g. (69 percent of theory), m.p. 262°–265° C. (decomposition).

 $C_{13}H_7NO_7$ (289.2)

|  | C | H | N |
|---|---|---|---|
| Calculated | 53.99 | 2.44 | 4.84 |
| Found | 54.30 | 2.30 | 4.80 |

EXAMPLE 44

2-(5-nitro-2-furfurylidene)-6-acetoxy-3-benzofuranone 1.92 g. of 6-acetoxy-3-benzofuranone and 1.4 g. of 5-nitrofurfural are refluxed for 5 hours in 40 ml. of acetic anhydride. The crystallized product obtained by cooling to −70° C. is recrystallized from ethyl acetate.

Yield: 0.9 g. (29 percent of theory), m.p. 172°–173° C. (decomposition).

$C_{15}H_9NO_7$ (315.2)

|  | N |
|---|---|
| Calculated | 4.44 |
| Found | 4.33 |

EXAMPLE 45

2-(5-nitro-2-furfurylidene)-6,7-diacetoxy-3-benzofuranone 1.66 g. of 6,7-dihydroxy-3-benzofuranone and 1.4 g. of 5-nitrofurfural are refluxed for 5 hours in 20 ml. of acetic anhydride, then cooled to −70° C.; the crystallized product is vacuum filtered and recrystallized from ethyl acetate.

Yield: 1.7 g. (46 percent of theory), m.p. 209°–210° C. (decomposition).

 $C_{17}H_{11}NO_9$ (373.3)

|  | C | H | N |
|---|---|---|---|
| Calculated | 54.70 | 2.97 | 3.75 |
| Found | 54.58 | 2.93 | 3.57 |

EXAMPLE 46

3-(5-nitro-2-furfurylidene)-7-acetoxy-chromanone 1.64 g. of 7-hydroxy-chromanone and 1.40 g. of 5-nitrofurfural are refluxed in 20 ml. of acetic anhydride for 5 hours, cooled to −70° C., and the thus-obtained crystallized product is recrystallized from ethyl acetate.

Yield: 1.2 g. (36 percent of theory), m.p. 176°–178° C. (decomposition).

$C_{16}H_{11}NO_7$ (329.3)

|  | C | H | N |
|---|---|---|---|
| Calculated | 58.36 | 3.37 | 4.25 |
| Found | 58.16 | 3.39 | 4.04 |

EXAMPLE 47

3-(5-nitro-2-furfurylidene)-7-methoxy-thiachromanone 3.88 g. of 7-methoxy-thiachromanone and 2.82 g. of 5-nitrofurfural are refluxed for 3.5 hours in 60 ml. of acetic anhydride; the substance which crystallizes after allowing the reaction mixture to stand for 24 hours is recrystallized from acetone.

Yield: 0.55 g. (9 percent of theory), m.p. 173° C. (decomposition).

 $C_{15}H_{11}NO_5S$ (317.3)

|  | S |
|---|---|
| Calculated | 10.57 |
| Found | 10.41 |

EXAMPLE 48

2-(5-nitro-2-thenylidene)-5-hydroxy-1-indanone

The preparation of this compound is conducted analogously to Example 1(c), but with 1.48 g. of 5-hydroxy-1-indanone and 2.6 g. of 5-nitrothiophene-2-carboxaldehyde. The product is recrystallized from ethyl acetate.

Yield: 1.5 g. (53% of theory), m.p. 235°–238° C. (decomposition).

$C_{14}H_9NO_4S$ (287.3)

|  | S |
|---|---|
| Calculated | 11.16 |
| Found | 11.30 |

EXAMPLE 49

2-(5-nitro-2-thenylidene)-6-hydroxy-5-methoxy-1-indanone

The preparation of this compound is conducted analogously to Example 1(c), but employing 1.78 g. of 6-hydroxy-5-methoxy-1-indanone and 2.35 g. of 5-nitrothiophene-2-carboxaldehyde diacetate. For purification purposes, the product is dissolved in dimethyl formamide at 70° C. and precipitated with water.

Yield: 1.9 g. (60 percent of theory), m.p. above 270° C.

 $C_{15}H_{11}NO_5S$ (317.3)

|  | C | H | N | S |
|---|---|---|---|---|
| Calculated | 56.80 | 3.49 | 4.42 | 10.09 |
| Found | 56.47 | 3.51 | 4.51 | 9.83 |

EXAMPLE 50

3-(5-nitro-2-thenylidene)-chromanone

This compound is prepared analogously to Example 2, but with 1.48 g. of chromanone and 1.57 g. of 5-nitrothiophene-2-carboxaldehyde. The product is recrystallized from ethyl acetate.

Yield: 0.9 g. (32 percent of theory), m.p. 198°–202° C. (decomposition).

$C_{14}H_9NO_4S$ (287.3)

|  | C | H | N | S |
|---|---|---|---|---|
| Calculated | 58.55 | 3.16 | 4.88 | 11.14 |
| Found | 58.50 | 3.32 | 4.78 | 11.20 |

EXAMPLE 51

2-(5-nitro-2-furfurylidene)-3-phenyl-1-indanone

The preparation of this compound is conducted analogously to Example 1(c), but with 4.16 g. of 3-phenyl-1-indanone.

Yield: 2.7 g. (41 percent of theory), m.p. 248° C. (from ethyl acetate).

$C_{20}H_{13}NO_4$ (331.4)

|  | N |
|---|---|
| Calculated | 4.24 |
| Found | 4.14 |

EXAMPLE 52

2-(5-nitro-2-furfurylidene)-5-benzyloxy-1-indanone 4.3 g. of 5-benzyloxy-1-indanone and 2.54 g. of 5-nitrofurfural are refluxed in 30 ml. of acetic anhydride for 5 hours. The solution is then cooled to −70° C.; the product which crystallizes is vacuum filtered and recrystallized from ethyl acetate.

Yield: 1.15 g. (18 percent of theory), m.p. 224°–225° C. (decomposition).

$C_{21}H_{15}NO_5(361.4)$

|  | C | H | N |
|---|---|---|---|
| Calculated | 69.79 | 4.18 | 3.88 |
| Found | 69.72 | 4.49 | 3.86 |

EXAMPLE 53

2-(5-nitro-2-furfurylidene)-5-ethoxyethoxy-1-indanone

The preparation of this compound is conducted analogously to Example 1(c), but with 2.2 g. of 5-ethoxy-ethoxy-1-indanone.

Yield: 2.4 g. (70 percent of theory), m.p. 145°–147° C. (from ethyl acetate).

$C_{18}H_{17}NO_6(343.3)$

|  | C | H | N |
|---|---|---|---|
| Calculated | 62.98 | 4.99 | 4.08 |
| Found | 62.98 | 4.99 | 4.18 |

EXAMPLE 54

2-(5-nitropyrrol-2-y(-methylene)-1-indanone 1.3 g. 1-indanone and 1.4 g 5-nitropyrrole-2-carboxyaldehyde are stirred in 20 ml. orthophosphoric acid for 5 hours at 60° C. The reaction mixture is then poured into ice-water, and the resultant insoluble product is recrystallized from dioxane.

Yield: 0.80 g (31 percent of theory); m.p. 260° C.

$C_{14}H_{10}N_2O_3(254.3)$

|  | C | H | N |
|---|---|---|---|
| Calculated | 66.0 | 3.95 | 11.00 |
| Found | 66.40 | 4.23 | 10.97 |

EXAMPLE 55

4-methyl-2-(nitropyrrol-2-yl-methylene)-1-indanone

The synthesis is conducted according to Example 54, however, with 444 mg. 4-methyl-1-indanone.

Yield: 750 mg. (92 percent of theory); m.p. above 280° C. (from dimethylformamide).

$C_{15}H_{12}N_2O_3$ (268.3)

|  |  |
|---|---|
| Calculated | N 10.43 |
| Found | N 10.62 |

EXAMPLE 56

5-methoxy-2-(5-nitropyrrol-2-yl-methylene)-1-indanone 1.16 g of 5-methoxy-1-indanone and 1.0 g of 5-nitro-2-pyrrol-aldehyde are stirred in 20 ml of orthophosphoric acid at 60° C for 1 hour and then at 80° C for 5 hours. The mixture is poured into ice-water. The insoluble product is filtered off and recrystallized from ethanol.

Yield: 1.7 g (84 percent of theory); m.p. 240° C.

|  | C | H | N |
|---|---|---|---|
| Calculated | 63.3 | 4.25 | 9.86 |
| Found | 63.31 | 4.70 | 9.78 |

EXAMPLE 57

200.0 g. of 2-(5-nitro-2-furfurylidene)-5-methoxy-1-indanone, 105.34 g. of corn starch, 8.0 g. of gelatin, white, 6.5 g. of talc, 0.112 g. of methyl-p-hydroxybenzoate and 0.048 g. of propyl-p-hydroxybenzoate are homogeneously mixed together and compressed to tablets of 320 mg. each on a tabletting press in a conventional manner.

EXAMPLE 58

2.0 g. of 2-(5-nitro-2-furfurylidene)-6-hydroxy-5-methoxy-1-indanone, 27.0 g. of lactose, 45.565 g. of corn starch, 4.0 g. of talc, 1.4 g. of gelatin, white, 0.024 g. of methyl-p-hydroxybenzoate and 0.011 g. of propyl-p-hydroxybenzoate are homogeneously mixed and compressed to tablets of 80 mg. each on a tabletting press in a conventional manner.

EXAMPLE 59

10.0 g. of 2-(5-nitro-2-furfurylidene)-6-hydroxy-5-methoxy-1-indanone, 60.0 g. of lactose, 4.9 g. of corn starch, 800 mg of magnesium stearate, 8 mg. of the methyl ester of p-hydroxybenzoic acid and 3.5 mg of the propyl ester of p-hydroxybenzoic acid are homogeneously mixed and compressed into vaginal tablets of about 750 mg in a conventional manner.

EXAMPLE 60

7-chloro-4.6-dimethoxy-2-(5-nitro-2-furfurylidene)-3-benzofuranone 0.46 g of 7-chloro-4.6-dimethoxy-3-benzofuranone and 0.28 g. of 5-nitrofurfural are refluxed in 5 ml. of acetic anhydride for 5 hours. The solution is then cooled to −70° C; the product which crystallizes is vacuum filtered and recrystallized from dimethyl formamide.

Yield: 0.4 g. (54 percent of theory); m.p. 262°–265° C (decomposition).

|  | C | H | N | Cl |
|---|---|---|---|---|
| Calculated | 51.23 | 2.87 | 3.98 | 10.08 |
| Found | 51.43 | 3.14 | 4.17 | 10.12 |

EXAMPLE 61

5-chloro-4.6-dimethyl-2-(5-nitro-2-furfurylidene)-3-benzofuranone 0.62 g of 5-chloro-4.6-dimethyl-3-benzofuranone and 0.56 g of 5-nitrofurfural are refluxed in 4 ml. of acetic anhydride for 5 hours. The solution is then cooled to −70° C and the resultant insoluble product is recrystallized from dimethyl formamide.

Yield: 0.1 g (7.8 % of theory); m.p. 259°–262° C. (decomposition).

|  | C | H | N | Cl |
|---|---|---|---|---|
| Calculated | 56.35 | 3.15 | 4.38 | 11.09 |
| Found | 56.38 | 3.40 | 4.40 | 10.79 |

EXAMPLE 62

3.4-dimethyl-7-acetoxy-2-(5-nitro-2-furfurylidene)-1-indanone 1.4 g of 3.4-dimethyl-7-hydroxy-1-indanone and 1.13 g of 5-nitrofurfural are refluxed in 8 ml. acetic anhydride for 5 hours. The solution is then cooled to −70° C and the obtained crystallized product is recrystallized from ethanol.

Yield: 0.9 g (33 percent of theory); m.p. 173°–176° C. (decomposition).

|  | C | H | N |
|---|---|---|---|
| Calculated | 63.53 | 4.15 | 4.12 |
| Found | 63.85 | 4.60 | 4.10 |

EXAMPLE 63

3.4-dimethyl-7-hydroxy-2-(5-nitro-2-furfurylidene)-1-indanone 0.4 g of 3.4-dimethyl-7-acetoxy-2-(5-nitro-2-furfurylidene)-1-indanone are refluxed in 10 ml. ethanol and 5 ml. of concentrated hydrochlorid acid for 2 hours. The solution is concentrated by destilling off 8 ml. of the solvent. A precipitate forms which is recrystallized from ethanol.

Yield: 0.15 g (43 percent of theory); m.p. 183°–187° C.

|  | C | H | N |
|---|---|---|---|
| Calculated | 66.42 | 4.05 | 4.70 |
| Found | 66.42 | 4.83 | 4.46 |

EXAMPLE 64

6-buturyloxy-2-(5-nitro-2-furfurylidene)-3-benzofuranone 1.09 g (4 millimoles) of 6-hydroxy-2-(5-nitro-2-furfurylidene-)-3-3-benzofuranone were heated in 20 ml. of butyric acid anhydride for 80 minutes at 140° C. The mixture was diluted with petroleum ether and the precipitate was filtered off and recrystallized from ethyl acetate.

Yield: 0.5 g (38 percent of theory); m.p. 106°–170° C

|  | C | H | N |
|---|---|---|---|
| Calculated | 59.48 | 3.82 | 4.08 |
| Found | 59.49 | 3.61 | 4.06 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A compound of the formula:

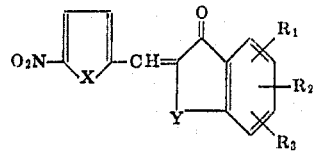

wherein

X is O;

Y is O; —O—CH$_2$—; or —CA$_2$—, A being H, methyl, or ethyl; and

R$_1$, R$_2$ and R$_3$ each represent alkyl, hydroxy, alkoxy, acyloxy, alkylsulfonyloxy, groups wherein each alkyl, alkoxy or acyl residue is not more than 5 carbon atoms and acyl is derived from an alkane carboxylic acid; or hydrogen, with the provision that at least one of R$_1$, R$_2$, R$_3$ is said hydroxy or acyloxy.

2. A compound as defined by claim 1 wherein Y is —CH$_2$—, at least two of R$_1$–R$_3$ are other than hydrogen, and at least one is said alkoxy or hydroxy.

3. A compound as defined by claim 1 wherein one of R$_1$–R$_3$ is hydroxy and another of R$_1$–R$_3$ is said alkoxy.

4. A compound as defined by claim 1 wherein Y is —CH$_2$—, and at least one of R$_1$–R$_3$ is hydroxy.

5. A compound as defined by claim 1 wherein at least one of R$_1$–R$_3$ is H.

6. A compound as defined by claim 1 wherein Y is —CH$_2$—.

7. A compound as defined by claim 1 wherein said compound is selected from the group consisting of 2-(5-nitro-2-furfurylidene)-5-acetoxy-1-indanone; and 2-(5-nitro-2-furfurylidene)-7-acetoxy-1-indanone.

8. A compound as defined by claim 1 wherein said compound is selected from the group consisting of 2-(5-nitro-2-furfurylidene)-7-hydroxy-1-indanone; 2-(5-nitro-2-furfurylidene)-5-propionyloxy-1-indanone; and 4-methyl-2-(nitropyrrol-2-yl-methylene)-1-indanone.

9. A compound as defined by claim 1 wherein said compound is selected from the group consisting of 3.4-dimethyl-7-acetoxy-2-(5-nitro-2-furfurylidene)-1-indanone; and 3.4-dimethyl-7-hydroxy-2-(5-nitro-2-furfurylidene)-1-indanone.

10. A compound as defined by claim 1, wherein said compound is 2-(5-nitro-2-furfurylidene)-5-hydroxy-1-indanone.

11. A compound as defined by claim 1, wherein said compound is 2-(5-nitro-2-furfurylidene)-5-acetoxy-1-indanone.

12. A compound as defined by claim 1, wherein said compound is 2-(5-nitro-2-furfurylidene)-5-propionyloxy-1-indanone.

13. A compound as defined by claim 1, wherein said compound is 2-(5-nitro-2-furfurylidene)-5,6-dihydroxy-1-indanone.

* * * * *